US009383756B2

(12) United States Patent
Certain

(10) Patent No.: US 9,383,756 B2
(45) Date of Patent: *Jul. 5, 2016

(54) AUTOMATIC FLIGHT CONTROL METHOD FOR A ROTORCRAFT ENABLING THE ROTORCRAFT TO MAINTAIN A PATH BY TRACKING MANUAL FLIGHT CONTROLS

(71) Applicant: AIRBUS HELICOPTERS, Marignange Cedex (FR)

(72) Inventor: Bernard Certain, Aix En Provence (FR)

(73) Assignee: Airbus Helicopters, Marignane (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/616,195

(22) Filed: Feb. 6, 2015

(65) Prior Publication Data
US 2015/0309513 A1 Oct. 29, 2015

Related U.S. Application Data

(63) Continuation of application No. 13/908,364, filed on Jun. 3, 2013, now Pat. No. 8,977,412.

(30) Foreign Application Priority Data

Jun. 6, 2012 (FR) ...................................... 12 01620

(51) Int. Cl.
*B64C 27/56* (2006.01)
*G05D 1/08* (2006.01)
*B64C 13/18* (2006.01)
*B64C 27/57* (2006.01)
*B64C 27/78* (2006.01)

(52) U.S. Cl.
CPC .............. *G05D 1/0808* (2013.01); *B64C 13/18* (2013.01); *B64C 27/57* (2013.01); *G05D 1/0858* (2013.01)

(58) Field of Classification Search
CPC ................................ B64C 27/56; B64C 27/78
USPC .................... 701/11, 3, 4, 8; 244/194, 235
See application file for complete search history.

(56) References Cited

U.S. PATENT DOCUMENTS

| 5,197,697 | A | 3/1993 | Lyloc |
| 8,991,745 | B1* | 3/2015 | Khan ...................... B64C 27/52 244/17.11 |
| 9,096,327 | B2* | 8/2015 | Tucker ................ G01M 5/0033 |
| 2003/0057331 | A1 | 3/2003 | Kinkead et al. |
| 2006/0058927 | A1* | 3/2006 | Aubourg ............... B64C 27/008 701/3 |
| 2008/0294305 | A1 | 11/2008 | Roesch |
| 2011/0137492 | A1 | 6/2011 | Sahasrabudhe |

FOREIGN PATENT DOCUMENTS

| FR | 1347243 A | 12/1963 |
| GB | 809278 A | 2/1959 |

OTHER PUBLICATIONS

Search report and Written Opinion; Application No. FR 1201620; Dated Feb. 4, 2013.

* cited by examiner

*Primary Examiner* — Tan Q Nguyen
(74) *Attorney, Agent, or Firm* — Brooks Kushman P.C.

(57) ABSTRACT

A method of enabling an autopilot (9) to cause a rotorcraft (1) to follow a path. At least one guide mode (G) relative to at least one progression axis (P, R, V, Y) of the rotorcraft (1) is selected by the rotorcraft pilot. Said selection causes the selected guide mode (G) to be inhibited (19) and causes a path setpoint (C) to be acquired (20) from the pilot of the rotorcraft (1) operating a manual control member (4) for controlling the progression of the rotorcraft (1). The path setpoints (C) relating to other guide modes (G) of the rotorcraft (1) that continue to be engaged are conserved in their initial states and the autopilot (9) adapts the commands relating to the progression axes (P, R, V, Y) relating to these other guide modes (G).

17 Claims, 2 Drawing Sheets

AUTOMATIC FLIGHT CONTROL METHOD FOR A ROTORCRAFT ENABLING THE ROTORCRAFT TO MAINTAIN A PATH BY TRACKING MANUAL FLIGHT CONTROLS

CROSS REFERENCE TO RELATED APPLICATIONS

This application is a continuation of U.S. application Ser. No. 13/908,364, filed Jun. 3, 2013, which claims priority to French patent application No. FR 12 01620 filed on Jun. 6, 2012, the disclosures of which are incorporated in their entirety by reference herein.

BACKGROUND OF THE INVENTION (1) Field of the Invention

The present invention relates to the field of rotorcraft, and more particularly to automatic flight control systems that have an influence on the flight behavior of the rotorcraft. The automatic flight control system for a rotorcraft to which the present invention relates is an automatic system for providing the pilot of the rotorcraft with assistance in performing difficult procedures acting on the flight behavior of the rotorcraft, in particular at low speeds, such as speeds of less than about 50 knots (kts).

(2) Description of Related Art

Rotorcrafts are aircrafts that differ from other powered aircraft mainly in their ability to fly both at high cruising speeds and to fly at low speeds or to hover. This ability is obtained by providing the rotorcraft with at least one main rotor having an axis that is substantially parallel to the antero-posterior plane of the rotorcraft and to the instant trim plane of the rotorcraft.

The main rotor comprises a rotary wing that provides the rotorcraft with lift and possibly also with thrust. The behavior of the rotorcraft in flight is modified by varying the cyclic and/or collective pitch of the blades of the rotary wing. A variation in the cyclic pitch of the blades leads to a change in the attitude of the rotorcraft, and more particularly to a change that can be varied between pitching and/or rolling. A variation in the collective pitch of the blades gives rise to a modification to the lift behavior of the rotorcraft, and more particularly behavior along the gravity axis or the instant trim plane.

When the main rotor provides lift only, and possibly also with marginal propulsion as happens with a hybrid helicopter, the rotorcraft is fitted with means specifically for providing propulsion. For example, hybrid helicopters have a main rotor serving to provide the major portion of the lift of the rotorcraft and, to a lesser extent, its propulsion, together with at least one propulsive propeller.

The rotorcraft is also maneuverable in yaw about its own vertical axis, by making use of a yaw anti-torque device. For example, such an anti-torque device is formed by an anti-torque rotor having an axis that is substantially horizontal compared with the substantially vertical axis of the main rotor. By way of example, the anti-torque rotor is a tail rotor of the rotorcraft, or, by way of example and in a hybrid helicopter, it is formed by at least one of the propulsive propellers fitted to such a hybrid helicopter. With an anti-torque rotor, varying the collective pitch of the blades of the anti-torque rotor gives rise to a variation in the yaw progression of the rotorcraft.

The specific ability of a rotorcraft to fly at low speeds or to hover implies a special organization for the means used to manage its flight behavior. The difficulties associated with such a special organization need to be considered independently of potential use of said means for high-speed progression of the rotorcraft.

A variation in the flight behavior of the rotorcraft is achieved by modifying flight parameters of the rotorcraft, which parameters are defined relative to cyclic and/or collective pitch values for the main rotor and/or collective pitch values for the anti-torque rotor. Such a modification to the flight parameters may be achieved using various control modes.

In a manual control mode, the pilot of the rotorcraft has manual control members that are moved by a person in order to vary the pitch of the blades or of the rotors by means of manual control linkages respectively allocated to each of the progression axes of the rotorcraft. The concept of "manual" should be understood as being in opposition to the concept of "automatic", without prejudice to the means actually used by a person for controlling the rotorcraft, in particular a hand-operated stick or foot-operated rudder pedals.

In an embodiment of a manual control mode, the manual control members are engaged with respective linkages for transmitting forces remotely, enabling the pilot of the rotorcraft to act mechanically on the blades by means of manual control members, either directly or else via servo-controls for a heavy helicopter.

In another embodiment of a manual control mode, movement of a manual control member by the pilot generates electrical signals for activating at least one blade-moving servo-control.

In an automatic control mode, an autopilot generates commands automatically for moving the blades by means of automatic control linkages allocated respectively to each of the progression axes of the rotorcraft. When the autopilot is activated, the automatic commands take the place of the commands generated by the pilot directly on the manual control members in order to activate the servo-controls.

The autopilot serves to maintain stable progression of the rotorcraft in compliance with a previously-stored setpoint. An actual state of progression of the rotorcraft is evaluated by the autopilot at a given instant, according to information supplied by onboard instrumentation of the rotorcraft. On the autopilot detecting a difference between the setpoint and the actual state of progression of the rotorcraft, the autopilot intervenes on the flight behavior of the rotorcraft in order to bring its actual state of progression back into conformity with the setpoint.

Activation of the autopilot is controlled by the pilot of the rotorcraft using one or more specific control knobs.

In a stabilization mode performed by the autopilot, an initial setpoint for maintaining the attitude of the rotorcraft is defined relative to the state of progression of the rotorcraft as evaluated on activating the autopilot. The stabilization mode stabilizes the rotorcraft by correcting the attitude of the rotorcraft by means of the autopilot acting relative to the initial setpoint.

On this topic, reference may be made for example to document FR 1 347 243 (Boeing Co.), which discloses ways of stabilizing the behavior of a rotorcraft by an autopilot by holding to previously-stored flight setpoints. The detection of a deviation of the rotorcraft from its path generated error signals, and flight commands are issued by the autopilot to correct the attitude of the rotorcraft until the error signals are reduced to a value of zero. The flight commands are issued by the autopilot for at least one of the progression axes of the rotorcraft in a manner that is mutually synchronized for all of the progression axes so that the behavior of the rotorcraft is kept stable in the event of the position of the rotorcraft being corrected relative to any one of the progression axes.

In a particular mode of piloting by transparency, the pilot of the rotorcraft may optionally act temporarily on the behavior of the rotorcraft by using the manual control linkages, thereby overruling the commands generated by the autopilot. The initial setpoint is left unchanged, and any temporary action on the part of the pilot on the behavior of the rotorcraft does not lead to any modification of the initial setpoint.

It is also known to correct an initial setpoint for maintaining attitude as a function of the actual state of progression of the rotorcraft as evaluated after the pilot has operated the manual control members. It is also known to enable the pilot of the rotorcraft to correct an initial setpoint for maintaining attitude by varying its values incrementally.

On this topic, reference may be made for example to the document GB 809 278 (Bendix Aviat Corp.), which describes such ways of correcting setpoints for maintaining attitude. More particularly, an autopilot maintains the positions of the elevators and the ailerons of an airplane in compliance with flight setpoints to achieve progression of the airplane that is stabilized in pitching, in roll, and in yaw. A human pilot can act on the progression of the airplane by modifying the positions of the ailerons, while conserving autopilot stabilization of the behavior of the airplane. At the end of the action taken by the human pilot, and once the attitude of the airplane is stabilized at the desired altitude, the flight setpoints are conserved in the current state of progression of the rotorcraft.

Stabilization of the rotorcraft is achieved using basic modes in which the autopilot acts e.g. to generate increased stability by damping angular movements of the rotorcraft, or indeed to maintain attitudes or a heading, or indeed to decouple progression axes, for example. These basic modes provide piloting comfort for the pilot of the rotorcraft, but they do not correct possible deviations of position of the rotorcraft. Proposals have therefore been made to associate higher modes of operation with such basic modes in order to eliminate possible deviations of position, of speed, and/or of acceleration of the rotorcraft. The behavior of the rotorcraft is managed by the autopilot as a function of the flight setpoint so as to keep the rotorcraft stable and so as to reestablish its position, its speed, or its acceleration by using the higher modes. The autopilot performs the operation of stabilizing the rotorcraft quickly by using the basic mode, whereas it subsequently performs the operation of reestablishing the position, the speed, and/or the acceleration of the rotorcraft more slowly by using the higher modes.

The autopilot is also capable of performing advanced functions of assisting the guidance of the rotorcraft. The facilities potentially made available by the higher modes are used in auxiliary manner to achieve such assistance. Various advanced functions may be used to achieve assistance in the guidance of the rotorcraft. The ways in which advanced functions are performed relate to predefined functionalities of the autopilot relating to a path to be followed by the rotorcraft.

In various advanced functions of the autopilot making use of the higher modes, the rotorcraft is guided by the autopilot relative to a previously-defined setpoint path. The autopilot can then make use of various geolocation means for guiding the rotorcraft along a setpoint path.

By way of example, the setpoint path is used relative to a flight mission as previously determined by the pilot of the rotorcraft, or it is used during a stage of approaching a known and identified site. In particular, such a site is fitted with means that provide interaction between the site and the autopilot, such as radio navigation beacons. In the absence of such interactive equipment, site identification is performed by the pilot of the rotorcraft in manual mode, and then the pilot of the rotorcraft activates the desired advanced function.

For such advanced functions making use of the higher modes of the autopilot, two superposed loops are used for servo-controlling flight parameters. A fast servo-control loop is used for correcting attitude, yaw, or verticality of the rotorcraft. A slow servo-control loop is used by the higher mode for reducing any guidance deviation of the rotorcraft to zero.

The autopilot is conventionally in communication with display means that provide the pilot of the rotorcraft with various kinds of information, e.g. such as information about various flight parameters, about the flight mission to be performed by the rotorcraft, about weather conditions, and/or about the environment outside the rotorcraft, or indeed about the environment at the site of intervention. Such information is useful for controlling the rotorcraft by the autopilot and/or by the pilot of the rotorcraft.

On this topic, reference may be made for example to the document US 2011/137492 (Sahasrabudhe Vineet et al.), which discloses ways of automatically guiding a rotorcraft along a path by making use of said advanced functions (a vertical takeoff and landing (VTOL) function). Guidance of the rotorcraft is performed in flight using instruments, while taking account of an actual state of progression of the rotorcraft and a state of progression that the rotorcraft is to achieve so as to be guided along a predefined approach path. The human pilot has information display means available that display information about guiding the rotorcraft along the path relative to the outside environment.

The ways in which the autopilot operates provide automatic assistance to piloting that is satisfactory in terms of correcting the attitude of the rotorcraft in a cruising stage of flight, at high speed, and while the rotorcraft is far away from the ground. During a cruising stage of flight, the surroundings of the rotorcraft are normally empty, and the pilot of the rotorcraft does not need to concentrate on maneuvering the rotorcraft. It can also happen that there is no need for such concentration when close to the ground and in a known environment, with this being made possible by using an advanced function of the autopilot, such as during a stage of approaching a known runway and/or a runway that is fitted with means for identifying its environment.

Automatic assistance obtained by the autopilot performing an advanced function can be satisfactory during a stage of approaching an intervention site, including at low speed, providing the intervention site is well known, identified, and indicated to the autopilot. Once the intervention site has been identified, it is possible to activate an advanced function in order to guide the rotorcraft along the corresponding setpoint path.

In general, rotorcraft are powered aircraft that are designed to be used under flight conditions that are difficult, such as at low speeds or while hovering, close to the ground anywhere, in a position that may be unknown or poorly known, and with arbitrary conditions of visibility and/or an environment that is hostile and/or unknown.

Under difficult flying conditions, unexpected factors might need to be taken into account by the pilot of the rotorcraft. It is difficult or even impossible for the pilot of the rotorcraft to make use of automatic assistance in maneuvering the rotorcraft under such difficult conditions. For example, when the rotorcraft is close to the ground, any change needed in its behavior must be performed quickly. The ways in which the autopilot operates make it difficult to act quickly to modify a path to be followed by the rotorcraft by making use of an advanced function that implements the higher modes.

Thus, a landing zone might be poorly known while the pilot of the rotorcraft is preparing a flight mission. Access conditions to the landing zone might initially be identified as being potentially difficult, or unknown, or indeed hostile. Access to the landing zone may also be made particularly difficult, since the real environment at the site might be different from and/or temporarily modified relative to the expectations of the pilot of the rotorcraft. Prior location of the landing zone using geolocation means can be approximate, and possibly even uncertain. Poor visibility does not make it any easier for the pilot of the rotorcraft to identify quickly on site the difficulties that need to be overcome in order to approach the landing zone.

Under such conditions, the pilot of the rotorcraft can become confused as to which automatic or manual control modes should be selected in order to approach a landing zone in a difficult flying situation. It is then found that the pilot of the rotorcraft needs to have available the advantages provided by piloting assisted by means of the autopilot, while still retaining the ability to intervene quickly in manual mode on the behavior of the rotorcraft.

It is useful to avoid the pilot of a rotorcraft becoming confused in this way during a difficult stage of approach to an intervention site, by enhancing the ways in which the autopilot operates so as to make it possible for the human pilot to intervene quickly on the behavior of the rotorcraft.

BRIEF SUMMARY OF THE INVENTION

The object of the present invention is to provide a method of using an automatic flight control system for a rotorcraft that enables a rotorcraft pilot to be relieved of such a feeling of confusion during a difficult approach stage to an intervention site.

The method of the invention is a method of using an automatic flight control system for a rotorcraft. Said automatic system has an autopilot that generates commands in predefined operating modes. The commands cause the behavior of the rotorcraft to be modified relative to at least one of the progression axes of the rotorcraft comprising at least the pitching, roll, vertical, and yaw axes, and possibly also the horizontal axis for a hybrid helicopter having propulsive propellers. The term "progression axes" is used to designate the control axes relative to which the progression of the rotorcraft in flight is controlled, regardless of whether that is under the control of the pilot of the rotorcraft and/or of the autopilot. On the basis of a command implemented relative to said progression axes, the behavior of the rotorcraft is modified relative to its six axes of freedom in the terrestrial frame of reference.

The said automatic control system is commonly in communication with onboard instrumentation of the rotorcraft, thus making it possible to evaluate the current state of progression of the rotorcraft at a given instant. On the basis of such an evaluation, the autopilot is advantageously suitable for acting on the flight behavior of the rotorcraft on the basis of previously-stored flight setpoints.

In the present invention, the method is mainly recognizable in that the autopilot incorporates a path-maintaining function for the rotorcraft. Said path-maintaining function comprises at least one guide mode of the autopilot for guiding the rotorcraft relative to at least one of said progression axes of the rotorcraft.

More particularly, in essential ways of performing the path-maintaining function, an acquisition request for acquiring at least one path setpoint defined by at least one flight parameter is issued by a person. Said path setpoint relates to said at least one guide mode. Thereafter, as a consequence of the person moving at least one manual control member to cause a modification to the behavior of the rotorcraft relative to at least any one of said progression axes, the autopilot generates:

an inhibit command whereby the autopilot inhibits said at least one guide mode of the rotorcraft for which said acquisition request to acquire a path setpoint has been issued and relating to said at least one progression axis relative to which the behavior of the rotorcraft is being modified by the person; and an acquisition command whereby the autopilot acquires the value of said at least one flight parameter relating to said path setpoint to be acquired and applicable to said at least one progression axis from which the behavior of the rotorcraft is being modified by the person, said value being evaluated under the condition said movement applied to the manual control member being interrupted. Said value on its own takes the place of the value of at least one said flight parameter acquired by the autopilot prior to the inhibit command.

It should be understood that said acquisition command relates to said at least one flight parameter concerning said path setpoint to be acquired. Under the effect of said person interrupting movement applied to the manual control member, the path setpoints relating to the other guide modes of the rotorcraft that have continued to be engaged and that relate to said other progression axes are conserved in the state they had prior to said person moving said at least one manual control member.

The commands generated by the autopilot relating to all of the progression axes that continue to be engaged are adapted by the autopilot depending on the current state of progression of the rotorcraft on the basis of said conserved path setpoints and on the basis of said value taking the place of said at least one flight parameter for which said acquisition request was issued.

The value of said flight parameter relating to the path setpoint to be acquired is evaluated in particular depending on the actual state of progression of the rotorcraft as determined from the onboard instrumentation of the rotorcraft. The value of said flight parameter relating to the path setpoint to be acquired is evaluated at the time the person interrupts movement of the manual control member, where that movement is what generated a modification in the behavior of the rotorcraft relative to the path setpoint for which the acquisition request was issued by the person.

It may be observed that the autopilot may acquire the value of any flight parameter before the inhibit command was issued by using any acquisition means, such as means commonly used in the field of rotorcraft. In other words, the way in which the initial value of a flight parameter is acquired before the inhibit command is immaterial when considering the way in which the value of this flight parameter is acquired depending on the specific ways in which the path-maintaining function of the present invention is implemented.

In terms of guiding the rotorcraft, the concept of "other" progression axes should be considered as designating the remainder of the set of said progression axes of the rotorcraft after said at least one progression axis of the rotorcraft relating to the guide mode constituting the subject of said inhibit command has been excluded from said set. Said other guide modes continue to be engaged, and should be considered as being guide modes for which said acquisition request did not generate a said inhibit command.

This is to be distinguished from a basic mode of the autopilot that serves to stabilize the rotorcraft, or indeed from decoupling progression axes of the rotorcraft, and a said guide mode of the rotorcraft. Such a basic mode can be performed or inhibited at the same time as the inhibit command is issued for inhibiting said at least one guide mode of the rotorcraft.

More particularly, in an implementation of the method, the inhibit command for inhibiting said at least one guide mode of the rotorcraft is preferably associated with a command for maintaining a basic mode of the autopilot for stabilizing the rotorcraft by damping its attitude.

The request for acquiring the path setpoint includes in particular a selection operation performed by a person using at least one said guide mode. Such a selection operation is performed by the person acting on a multiple choice control member. By using such a multiple choice control member, the person selects at least one said guide mode from any one of at least a plurality of guide modes. Such a plurality of guide modes advantageously relate respectively at least to:

maintaining a rate of progression of the rotorcraft in attitude. Such a guide mode is preferably associated with the said command for maintaining a mode in which the rotorcraft is stabilized by the autopilot;

maintaining a rate of progression of the rotorcraft vertically;

maintaining a hovering position;

maintaining a rate of progression of the rotorcraft in yaw;

maintaining an orientation of the rotorcraft relative to a heading;

maintaining a slope of the rotorcraft;

maintaining an acceleration of the rotorcraft relative to the axes of the local geographical frame of reference;

maintaining an acceleration of the rotorcraft relative to the progression axes of the rotorcraft;

maintaining a coordinated turn by the rotorcraft;

maintaining the position of the rotorcraft relative to side slip;

maintaining an air speed of the rotorcraft;

maintaining an angle of incidence of the rotorcraft;

maintaining an altitude of the rotorcraft;

maintaining a height of the rotorcraft; and maintaining a speed of the rotorcraft along a path, or analogously a ground speed.

The vertical rate of progression acquired by the autopilot is likely to be zero, in order to maintain the center of gravity of the rotorcraft in a given vertical position, regardless of whether it is measured in terms of altitude or of height. Such a zero vertical rate of progression may optionally correspond to maintaining the rotorcraft in hovering flight.

The vertical progression of the rotorcraft may correspond equally well to the rotorcraft moving away from or towards a landing zone. Such a guide mode corresponds in particular to the autopilot acquiring a path setpoint based on maintaining a vertical position or a vertical position variation for the rotorcraft in order to assist the pilot of the rotorcraft by performing a path-maintaining function relating to maintaining a slope. Such a position or position variation is maintained in particular by acquiring a collective pitch value for the blades of the main rotor and possibly by adapting the current values of the cyclic pitch of the blades of the main rotor of the rotorcraft in pitching and/or in roll, and the collective pitch of the blades of an anti-torque rotor or analogous values relating to using any anti-torque device.

In particular, the orientation of the rotorcraft relative to a heading may be maintained equally well relative to geographic north or to magnetic north. Such a guide mode corresponds in particular to the autopilot acquiring a path setpoint based on maintaining the orientation of the rotorcraft in yaw, such as from acquiring a collective pitch value for the anti-torque rotor or the like, and the autopilot adapting the current values of the cyclic pitch and of the collective pitch of the blades of the main rotor.

According to a general feature of the present invention, it should be considered that the guide mode relating to maintaining the orientation of the rotorcraft relative to the yaw axis may be performed using any anti-torque device, e.g. such as an anti-torque rotor, a tail rotor, or a propulsive propeller of a hybrid helicopter, in particular, or an air jet device, or any other analogous anti-torque device. The arrangement described relating to using such a tail rotor may be transposed, where appropriate, to the specific modes of operation of any other anti-torque device of different structure that might be used.

The guide mode for maintaining the slope of the rotorcraft may apply equally well to tracking a ground slope or an air slope. Such a guide mode corresponds for example to the autopilot acquiring a path setpoint based on maintaining an angle of inclination of the rotorcraft, which may equally well be in pitching and/or in roll, and varying the vertical position of the rotorcraft. Such provisions advantageously lead to piloting assistance for the purpose of moving the rotorcraft towards, or conversely away from, a predetermined landing zone, with a given attitude orientation of the rotorcraft. Maintaining an inclination angle of the rotorcraft in this way can potentially be obtained by acquiring cyclic pitch values for the main rotor, which may equally well be in pitching and/or in roll, by adapting the current value of the collective pitch of the anti-torque rotor, and equally well by adapting the current value or acquiring the value of the collective pitch of the blades of the main rotor.

Maintaining the acceleration of the rotorcraft may be considered equally well as being positive or negative. Such a guide mode corresponds in particular to the autopilot acquiring a path setpoint based on maintaining a forward direction of the rotorcraft as defined relative to the pitching, roll, yaw, and vertical axes, while taking account of a variation in the speed of the rotorcraft along at least any one of said progression axes.

Depending on the at least one progression axis of the rotorcraft taken into consideration at the time the corresponding manual control member is moved, such a variation in the speed of the rotorcraft may be obtained for example by acquiring values for a continuous variation in the pitch of the blades of the main rotor, which may apply equally well varying cyclic pitch and/or varying collective pitch. Also by way of example, said speed variation may be procured by continuously varying the collective pitch of the blades of the anti-torque rotor. The current values for the pitch of the blades relating respectively to one or more of the progression axes of the rotorcraft that have not been the subject of a person moving a corresponding manual control member are adapted accordingly.

In general, the acquisition by the autopilot of said path setpoint relating to said acquisition command is in particular an acquisition:

either of a flight parameter relating to a variation in the collective pitch of the blades of a main rotor of the rotorcraft, which parameter may be a constant value or a value variation to be maintained. The value of a flight parameter relating to a variation in the cyclic pitch of the main rotor and the value of a flight parameter relating to a variation in the collective pitch of an anti-torque rotor of the rotorcraft remain unchanged;

or a flight parameter relating to a variation in the cyclic pitch of the blades of the main rotor, being either a constant value or a value variation to be maintained. The value of a flight parameter relating to a variation in the collective pitch of the blades of the main rotor and the value of a flight parameter relating to a variation in the collective pitch of the anti-torque rotor remain unchanged;

or both of said flight parameters relating to respectively to a collective pitch variation and to a cyclic pitch variation of the blades of the main rotor, which may be constant values or value variations to be maintained. The value of a flight parameter relating to a variation in the collective pitch of the blades of the anti-torque rotor remains unchanged;

or else a flight parameter relating to a variation of the collective pitch of the blades of the anti-torque rotor, which may be a constant value or a value variation to be maintained. The value of a flight parameter relating to a variation in the cyclic pitch of the main rotor and the value of a flight parameter relating to a variation in the collective pitch of the main rotor remain unchanged.

The value of said at least one flight parameter is evaluated depending on the actual state of progression of the rotorcraft as determined by onboard instrumentation of the rotorcraft. Such onboard instrumentation comprises a plurality of measurement means that are commonly fitted to rotorcraft. By way of indication and as a non-exhaustive enumeration, such measurement means may comprise:

means for determining a rate of progression of the rotorcraft along any one at least of the progression axes of the rotorcraft. The rate of progression of the rotorcraft that is taken into account may equally well be a vertical speed, an air speed, an indicated air speed, and/or a ground speed;

means for determining a slope of the rotorcraft;

barometric means for measuring the altitude of the rotorcraft;

radio altimeter means for measuring the height of the rotorcraft;

means for evaluating a deviation of the rotorcraft from a horizontal path relative to a path setpoint previously acquired by the autopilot. The horizontal path of the rotorcraft is defined in particular together with reference to the pitching axis and to the roll axis;

means for evaluating a deviation of the rotorcraft from a vertical path;

means for determining the progression of the rotorcraft by radio navigation; and inertial sensor means, comprising accelerometers and/or angular speed sensors of the rotorcraft.

The performance of the path-maintaining function is preferably associated with an operation of displaying various kinds of data on a display member. The data that is displayed is selected to be appropriate for enabling the pilot to make use of the path-maintaining function under the best possible conditions, particularly in an environment that is hostile, uncertain, or poorly known.

More particularly, the displayed data comprises in particular the environment outside the rotorcraft, a model representing the rotorcraft, a representation of a landing zone for the rotorcraft moving relative to said landing zone, equally well approaching it conversely going away from it, and the following illustrations relating to said outside environment:

an illustration of a variation in the orientation of the rotorcraft relative to a horizon line;

an illustration of a variation in the orientation and the position of the rotorcraft relative to the displayed landing zone; and at least one illustration of information predicting the position and the orientation of the rotorcraft relative to the displayed landing zone. Said predictive information is derived in particular by projection from variation in the position and the orientation of the rotorcraft from at least one current path setpoint.

The display operation is potentially performed equally well by a head-up display, by a head-down display, or by an in-between display.

The display of the environment outside the rotorcraft is preferably a representation of the world outside the rotorcraft as a three-dimensional image.

The illustration of a variation in the orientation of the rotorcraft relative to the horizon line preferably comprises moving the model of the rotorcraft inclined in a lateral attitude relative to the horizon line that is displayed as being horizontally stationary and vertically movable.

In a preferred implementation, the performance of the path-maintaining function depends on an operation of evaluating the pertinence of a movement of at least one said manual control member. Said evaluation operation is an operation of using calculation to determine the pertinence of a movement of at least one manual control member, based on processing a signal for detecting such movement by calculation.

More particularly, the calculation processing of the detection signal comprises an operation of smoothing the detection signal in time. On the basis of the smoothed detection signal, an operation is performed of determining the energy that has been developed in order to move the manual control member. Thereafter, an operation is performed of comparing said previously-determined developed energy with a predefined threshold that is considered as being representative of voluntary movement of the manual control member by the person.

The method performed before performing said comparison is preferably a subsidiary operation of converting an analog signal that identifies said developed energy into a logic signal representative of the mean developed energy.

BRIEF DESCRIPTION OF THE SEVERAL VIEWS OF THE DRAWINGS

Embodiments of the present invention are described with reference to the figures of the accompanying sheets, in which.

DETAILED DESCRIPTION OF THE INVENTION

Figure 1:
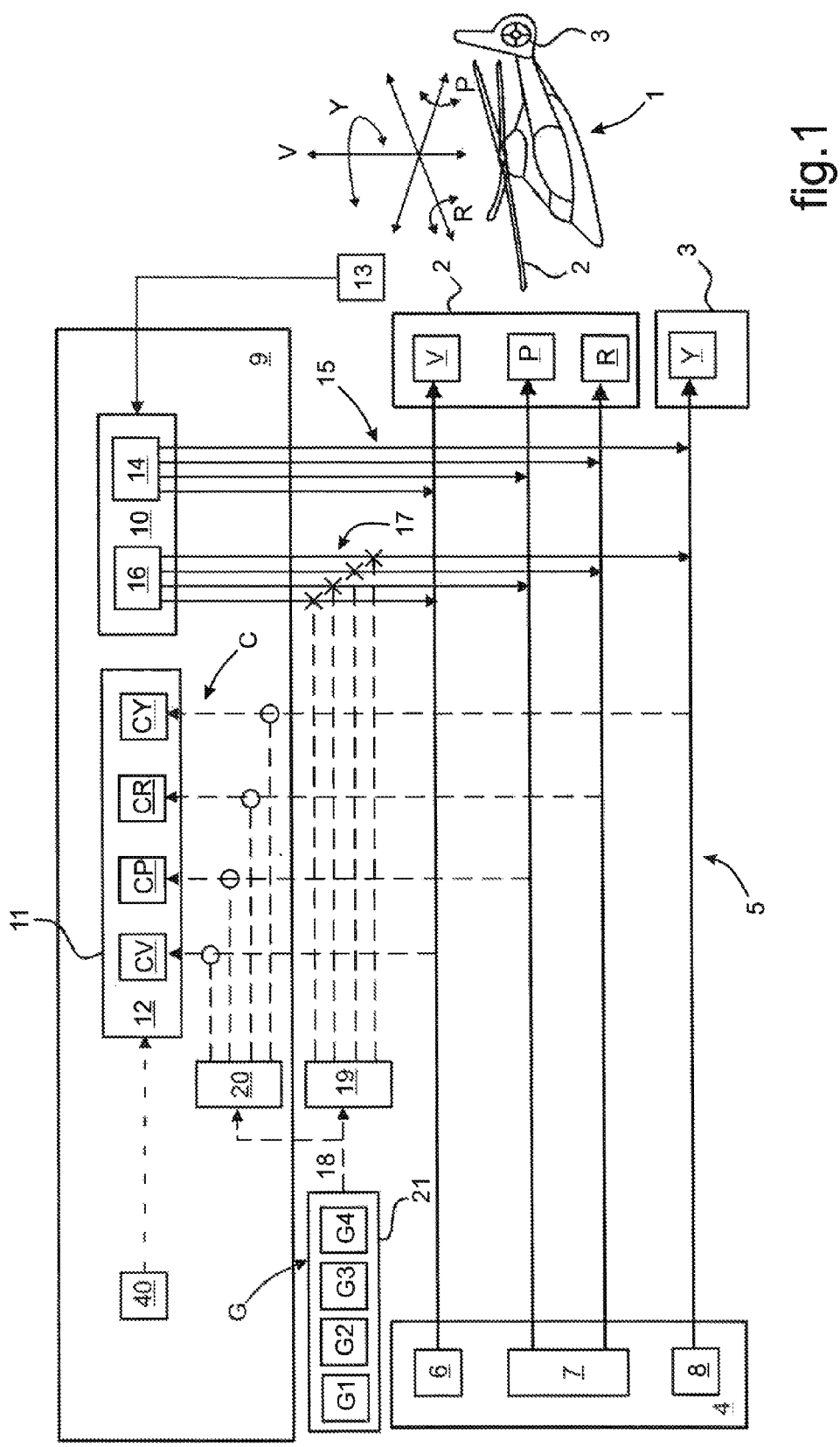
FIG. 1 is a diagram showing an implementation of an autopilot in accordance with a method of the present invention.

In FIG. 1, a rotorcraft 1 is an aircraft having rotors 2, 3 for moving with six degrees of freedom in a local geographical frame of reference, on the basis of four progression axes taken into consideration for piloting the aircraft. These progression axes comprise pitching P, roll R, yaw Y, and verticality V. In the implementation shown, the main rotor 2 provides the rotorcraft 1 with lift and propulsion, and a tail rotor 3 provides the rotorcraft with yaw guidance.

The rotorcraft 1 has manual control members 4 for modifying the behavior in flight of the rotorcraft 1 via manual control linkages 5. The manual control members 4 are moved by a person, in particular the pilot of the rotorcraft, and they comprise in particular a collective pitch stick 6 for varying the collective pitch of the blades of the main rotor 2, a cyclic stick 7 for varying the cyclic pitch of the blades of the main rotor 2, and rudder pedals 8 for varying the collective pitch of the blades of the tail rotor 3. A person moving the collective stick 6 makes it possible to modify the behavior of the rotorcraft 1 vertically V. Moving the cyclic stick 7 enables a person to modify the behavior of the rotorcraft 1 in attitude P, R. Moving the rudder pedals 8 enables a person to modify the behavior of the rotorcraft 1 in yaw Y.

The rotorcraft 1 is also fitted with an autopilot 9 that provides piloting assistance to the pilot of the rotorcraft 1 via automatic control linkages 10. Conventionally, an autopilot 9 generates commands in the application of previously-stored flight setpoints 11 in order to stabilize the rotorcraft 1 on the basis of those flight setpoints 11. The autopilot has memory means 12 for storing the flight setpoints 11 relative to each of the progression axes P, R, V, Y of the rotorcraft 1.

Any deviation from maintaining a progression of the rotorcraft 1 relative to the flight setpoints 11 is detected by the autopilot 9 by comparing the previously-stored flight setpoints 11 with an actual state of progression of the rotorcraft 1 as evaluated by means of onboard instrumentation 13 of the rotorcraft 1.

On the basis of the flight setpoints 11, the autopilot 9 generates commands that operate two superposed loops servo-controlling the flight parameters of the rotorcraft 1. In a stabilization mode 14, fast servo-control loops 15 act on correcting the attitude of the rotorcraft 1. In higher modes 16, slow servo-control loops 17 serve to correct position, speed, and/or acceleration of the rotorcraft 1 following a correction of the attitude of the rotorcraft 1. Said slow and fast servo-control loops 15 and 17 enable the flight parameters of the rotorcraft 1 to be varied relative to each of the progression axes P, R, V, Y of the rotorcraft 1.

The present invention proposes making use of the higher modes 16 that are conventionally used for correcting the position, the speed, and/or the acceleration of the rotorcraft 1 for the purpose of assisting the pilot of the rotorcraft 1 in maintaining a desired path selectively relative to at least any one of the progression axes P, R, V, Y of the rotorcraft.

In an approach of the present invention, such assistance takes account of the rotorcraft pilot selecting a piloting assistance request relative to at least one predetermined guide mode G (G1, G2, G3, G4, or even more). Said assistance request is more specifically a request 18 to acquire a path setpoint. The assistance provided to the rotorcraft pilot also takes account of a person moving at least one of the manual control members 4 in order:

to inhibit 19 the action of the autopilot 9 in the higher mode(s) 16 relating to the progression axis(es) P, R, V, Y of the rotorcraft 1 on which the pilot of the rotorcraft 1 is taking action. Said higher mode(s) 16 relate to a previously-selected guide mode G;

to replace 20 an initial path setpoint C (CV for a path setpoint in verticality V, CP for a path setpoint in pitching P, CR for a path setpoint in roll R, CY for a path setpoint in yaw Y) corresponding to said selected guide mode G and corresponding to the rotorcraft pilot acting on the manual control member 4 with a path setpoint C corresponding to the actual state of progression of the rotorcraft 1 as evaluated under the effect of the pilot of the rotorcraft interrupting movement of the manual control member 4.

The flight setpoints 11 relating to the progression axes P, R, V, Y of the rotorcraft 1 that are not associated with the axes P, R, V, Y associated with the previously-selected guide mode G remain unchanged. The commands generated by the autopilot 9 relating to all of the progression axes P, R, V, Y that continue to be engaged are adapted by the autopilot 9 depending on the current state of progression of the rotorcraft 1. It should be considered that said progression axes P, R, V, Y that continue to be engaged are those relating to the higher modes 16 that belong to a guide mode G that has not been subjected to a said prior selection by the pilot of the rotorcraft 1, and consequently for those progression axes P, R, V, Y that continue to be engaged, said inhibition operation is without effect. The autopilot 9 adapts the commands on the basis of said unchanged flight setpoints 11 and on the basis of the path setpoint C that has been subjected to the acquisition request 20.

Such provisions are particularly useful when the rotorcraft 1 is approaching a landing zone in difficult situations. The pilot of the rotorcraft 1 can make use of two capabilities of the higher modes 16 for assisting the pilot depending on the piloting needs of the rotorcraft 1, including in particular an ordinary and conventional need, and a need in difficult flight situations.

In a current assistance need, the pilot of the rotorcraft 1 may be assisted in flight by the higher modes 16 in a traditional mode of stabilizing the rotorcraft 1. Such a current assistance need may be used in a flight situation that is clear, remote from any obstacles, such as a cruising flight situation, or indeed a comfortable approach situation. By way of example, such a comfortable approach situation involves a known approach zone that is clearly identified and that does not present any particular difficulties in piloting the rotorcraft, and possibly also that has equipment on the ground for providing assistance in guiding the rotorcraft 1.

In a difficult flight situation, the pilot of the rotorcraft 1 may be assisted in flight by the higher modes 16, in particular during a difficult approach stage to an unknown landing zone and/or under weather conditions that are difficult, or indeed in an environment that is hostile. In a difficult flight situation, the pilot of the rotorcraft 1 can selectively change one or more flight setpoints 11 with reference to a guide mode G that has been selected by the pilot of the rotorcraft 1, by operating at least any one of the manual control members 4. The other flight setpoints 11 relating to those guide modes G that have not been selected are left unchanged and they are retained. The values of the flight parameters relating to said changed flight setpoints 11 are stored by the autopilot under the effect of the pilot of the rotorcraft 1 interrupting movement of said at least one manual control member 4, with the commands relating to the other flight parameters being adapted accordingly by the autopilot 9.

In respective variant implementations of the present invention, a said piloting assistance request issued by the pilot of the rotorcraft 1 in accordance with applying a path-maintaining function of the present invention either interrupts or does not interrupt the autopilot 9 maintaining a basic mode of operation of the autopilot 9 that provides the rotorcraft 1 with stability by damping variations in attitude by means of said fast servo-control loops 15.

More particularly, the pilot of the rotorcraft 1 has a multiple-choice member 21 for activating the path-maintaining function on the basis of selecting at least one guide mode G of the rotorcraft 1. The selective guide mode G is a guide mode G for which the pilot of the rotorcraft 1 seeks to be able to intervene freely without being confronted by any potential intervention of the higher mode(s) 16 relating to this guide mode G.

In addition, under the effect of an interruption of the intervention of the pilot of the rotorcraft 1 on the behavior of the rotorcraft 1, at least one path setpoint C relating to the selected guide mode G is taken into account by the autopilot 9 depending on the actual state of progression of the rotorcraft 1 as evaluated by the onboard instrumentation 13 at the instant of said interruption.

Activating the multiple-choice member 21 generates an inhibit command 19 for inhibiting the slow servo-control loop(s) 17 associated with the higher modes 16 of guiding the rotorcraft 1, with respect to at least one of the progression axes P, R, V, Y of the rotorcraft 1 (with verticality V serving for example to enable the rotorcraft to maintain a slope). Said at least one progression axis P, R, V, Y relates to said at least one guide mode G as previously-selected by the pilot of the rotorcraft 1. The pilot can control the rotorcraft 1 and modify the flight parameters of the rotorcraft 1 without encountering any resistance that might potentially be generated by the autopilot 9.

The values of the flight parameters of the rotorcraft 1 relating to the other progression axes P, R, V, Y of the rotorcraft 1 (pitching P, roll R, and yaw Y for the same example of maintaining a slope), are potentially adapted by the autopilot 9 on the basis of the flight setpoints 11 as initially stored and that remain unchanged. Such an adaptation is performed depending on the current state of progression in flight of the rotorcraft 1, on the basis of the modification to the behavior of the rotorcraft 1 made by the pilot of the rotorcraft relative to the progression axis on which the pilot is intervening (verticality V for said example of causing the rotorcraft to maintain a slope) by means of the manual control member 4.

An interruption in the movement of the manual control member 4 by the pilot of the rotorcraft 1 generates an acquisition command 20 causing the autopilot 9 to acquire the current path setpoint(s) C as evaluated by means of the onboard instrumentation 13 concerning the actual state of progression of the rotorcraft 1. The path setpoint(s) C concerned by the acquisition command are those relating to the prior movement to the manual control member 4 by the pilot of the rotorcraft, with the other flight setpoints 11 remaining unchanged.

The current value(s) of the flight parameter(s) as modified by said movement of the manual control member 4 by the pilot of the rotorcraft 1 is/are acquired by the autopilot 9 to replace the initial value(s). The commands generated by the autopilot relating to the other flight parameters are corrected, where appropriate, relative to their respective initial values depending on the current state of progression of the rotorcraft 1, which varies on the basis of the acquired path setpoint C corresponding to said value(s) of the flight parameter(s) as modified by issuing the acquisition command.

It should be considered that the term "initial value" is used to mean the value of a flight parameter as stored before the person moves the manual flight control member(s) 4, and providing the path-maintaining mode has been activated by using the multiple-choice member 21. With respect to implementing the method of the present invention, the ways in which said initial values of the flight parameters are acquired are immaterial. For example, a said initial value may have been acquired or modified by conventional means 40 for acquiring a flight setpoint of the kind commonly fitted to the rotorcraft, or it may have been acquired from earlier activation of a guide mode G.

It should be observed that in the implementation shown, it is preferable to maintain stabilization assistance of the rotorcraft 1 by the autopilot 9 making use of the stabilization means 14, in spite of the pilot of the rotorcraft 1 activating the path-maintaining function that makes use of the higher modes 16. In a variant, such stabilization assistance is inhibited under the effect of the pilot of the rotorcraft 1 activating the path-maintaining function.

Figure 2:
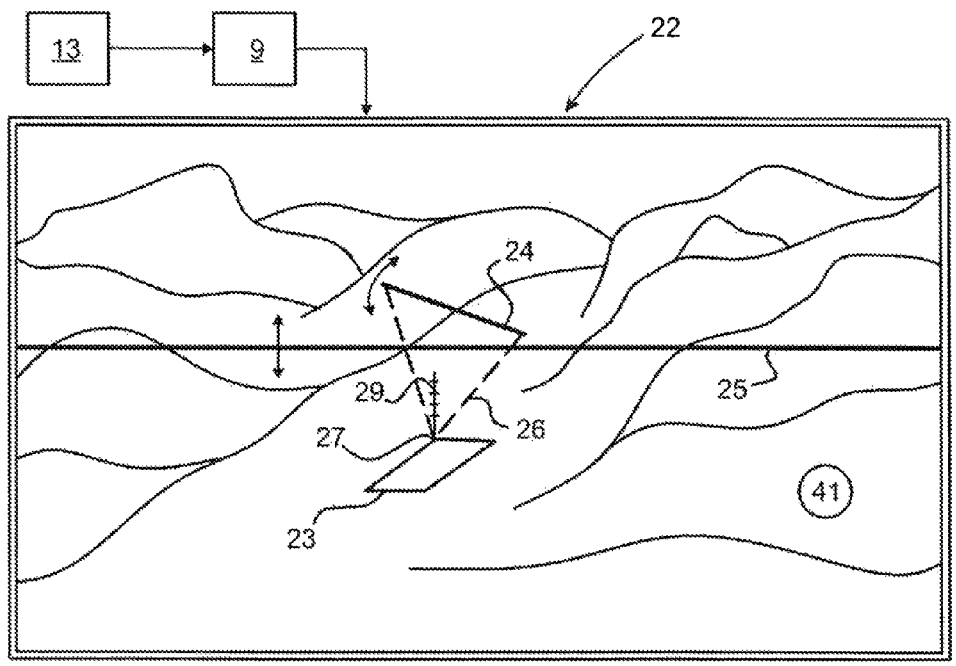
FIG. 2 is a diagram of display means associated with the autopilot shown in FIG. 1, for giving assistance to the pilot of a rotorcraft implementing a method of the present invention.

In FIG. 2, the assistance in maintaining the path of the rotorcraft by making use of the various guide modes is associated with visual assistance for the pilot of the rotorcraft showing the path being followed by the rotorcraft relative to a landing zone.

Without being restrictive, it should be recalled that use of the method of the present invention is particularly appropriate for a rotorcraft flying relative to a landing zone under conditions that are difficult, both with respect to the hostility of the external environment and with respect to it being possible that the information relating of the terrain being approached is not certain.

The pilot of the rotorcraft has a display member 22 showing the environment 41 outside the rotorcraft 1, and preferably shown three-dimensionally, with a representation of the relief surrounding the landing zone 23 being approached by the rotorcraft 1. A model 24 representing the rotorcraft 1 is shown, preferably diagrammatically in the form of a line. This model 24 is moved by the autopilot 9 on the basis of information supplied by the onboard instrumentation 13. The movement of the model 24 is shown relative to a horizon line 25 that is horizontally stationary but that moves vertically, and relative to said landing zone 23 that is being approached and that is shown diagrammatically.

The movement of the model 24 relates in particular to variation in the orientation of the rotorcraft 1 relative to the horizon line 25 and relative to the landing zone 23 under approach, such as on the basis of a variation in the lateral attitude tilt of the model 24. The horizon line 25 is held stationary horizontally, even when the rotorcraft turns, but it is movable vertically as a function of the longitudinal attitude being maintained by the rotorcraft.

A beam 26 projected from the model 24 shows the slope being maintained by the rotorcraft relative to a predicted landing zone 27 of the rotorcraft, given its current path. This beam 26 is associated with a diagrammatic illustration of a scale representing the value of a speed vector 29 representative of the speed of approach of the rotorcraft towards the predictive landing zone 27.

On the basis of these indications, the pilot of the rotorcraft can quickly and easily correct the path of the rotorcraft by making use of the path-maintaining function proposed by the present invention.

It should be considered that the path-maintaining function may be used both during an approach to and when departing from a landing zone. In addition, the particularly appropriate purpose of the path-maintaining function for assisting in the guidance of a rotorcraft flying relative to a landing zone does not in any way prejudice other applications that might be made of the path-maintaining function, including under various flight conditions of the rotorcraft, e.g. including during cruising flight.

Figure 3:
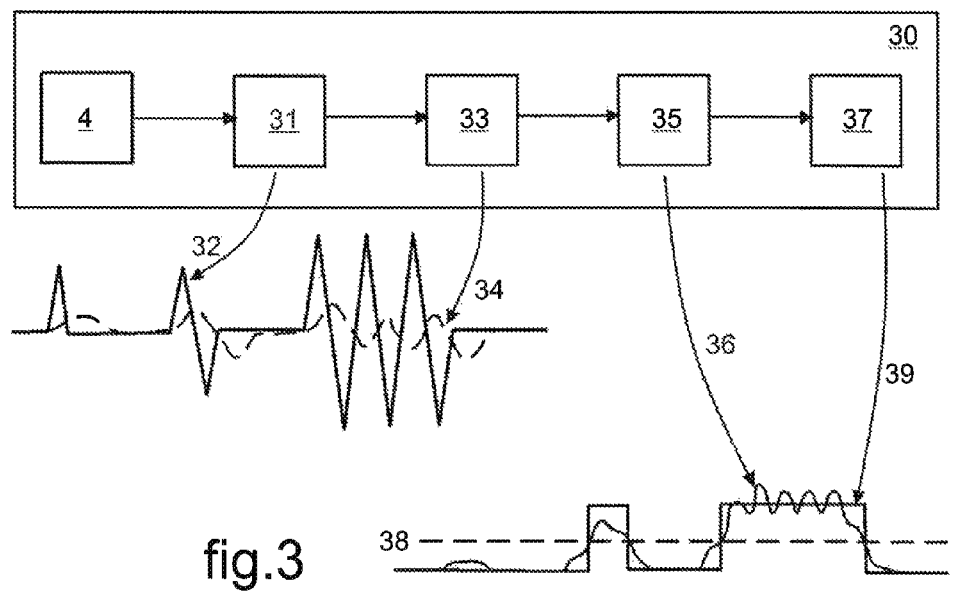
FIG. 3 is a diagram showing an example of an operation of evaluating the pertinence of a movement of a manual control member used by a person in an implementation of the present invention.

In FIG. 3, it is proposed to validate a movement of any manual control member 4 that might be moved by a person in order to modify the flight behavior of the rotorcraft by analyzing such movement. Such provisions seek to avoid performing the path-maintaining function as a result of movements of the manual control member 4 that are not the result of it being moved voluntarily by the pilot of the rotorcraft. Validating the pertinence of a movement of the manual control member 4 by a person is performed by analyzer means 30 for analyzing this pertinence on the basis of determining the energy developed for moving the manual control member 4.

Said analyzer means 30 make use of detector means 31 for detecting that the manual control member 4 is being moved, and they generate a detection signal 32 representative of such movement. A smoothing operation 33 is then performed to smooth the detection signal 32 over time, and a smoothed detection signal 34 is generated.

From the smoothed detection signal 34, a developed energy signal 36 is determined by calculation 35 relating to the movement applied to the manual control member 4. The developed energy signal 36 is then compared 37 with a predefined threshold 38 that is considered as being representative of a person deliberately moving the manual control member 4. The developed energy signal 36 is preferably previously converted into a logic signal 39 representative of the mean developed energy, and on the basis of which said comparison 35 is performed.

What is claimed is:

1. A method of using an automatic flight control system for a rotorcraft having an autopilot that generates commands in predefined operating modes, the commands causing a modification to the behavior of the rotorcraft relative to at least one progression axis (P, R, V, Y), the rotorcraft having manual control members to cause a modification to the behavior of the rotorcraft relative to at least one progression axis (P, R, V, Y), the method comprising:
   performing by the autopilot a path-maintaining function including at least one guide mode (G) of the autopilot for guiding the rotorcraft relative to at least one of the progression axes (P, R, V, Y) of the rotorcraft, in which the path-maintaining function includes receiving an acquisition request for a person to acquire at least one path setpoint defined by at least one flight parameter, each path setpoint relating to said at least one guide mode (G);
   as a result of the person driving at least one manual control member to cause a modification to the behavior of the rotorcraft relative to at least one progression axis (P, R, V, Y), generating by the autopilot:
      an inhibit command whereby the autopilot inhibits said at least one guide mode (G) of the rotorcraft for which the acquisition request has been issued and relating to said at least one progression axis relative to which the behavior of the rotorcraft is being modified by the person; and
      an acquisition command whereby the autopilot acquires an acquired value of at least one flight parameter relating to each path setpoint to be acquired and applicable to at least one progression axis from which the behavior of the rotorcraft is being modified by the person, the acquired value being acquired when said movement applied for driving the manual control member is interrupted, and the acquired value replacing the value of the at least one flight parameter acquired by the autopilot prior to the acquisition command;
   the path setpoints relating to the other guide modes (G) that have continued to be engaged and that relate to other progression axes (P, R, V, Y) being maintained in their states prior to said at least one manual control member being driven, and the commands generated by the autopilot relating to all of the progression axes that continue to be engaged being adapted by the autopilot depending on the current state of progression of the rotorcraft on the basis of said maintained path setpoints and on the basis of the acquired value of the at least one flight parameter for which said acquisition command was issued.

2. The method according to claim 1, wherein the inhibit command for inhibiting said at least one guide mode (G) of the rotorcraft is associated with a command for maintaining a basic mode of the autopilot, for stabilizing the rotorcraft by damping its attitude.

3. The method of claim 1, wherein the predefined operating modes including at least one of: low speed operating mode at air speeds of less than about 50 knots, approach stage operating mode to an unknown landing zone, when close to the ground operating mode, bad weather operating mode and hostile environment operating mode.

4. The method according to claim 1, wherein the acquisition request comprises a selection operation wherein by a multiple choice control member, the person selects at least one said guide mode (G); the automatic flight control system having a plurality of guide modes (G) relating respectively to at least two of the following:
   maintaining a rate of progression of the rotorcraft in attitude (P, R);
   maintaining a rate of progression of the rotorcraft vertically (V);
   maintaining a rate of progression of the rotorcraft in yaw (Y);
   maintaining an orientation of the rotorcraft relative to a heading;
   maintaining a slope of the rotorcraft;
   maintaining a hovering position;
   maintaining an acceleration of the rotorcraft relative to the axes of the local geographical frame of reference;
   maintaining an acceleration of the rotorcraft relative to the progression axes (P, R, V, Y) of the rotorcraft;
   maintaining a coordinated turn by the rotorcraft;
   maintaining the position of the rotorcraft relative to side slip;
   maintaining an air speed of the rotorcraft;
   maintaining an angle of incidence of the rotorcraft;
   maintaining an altitude by the rotorcraft;
   maintaining a height by the rotorcraft; and
   maintaining a speed of the rotorcraft along a path.

5. A method according to claim 1, wherein the acquisition by the autopilot of said path setpoint relating to said acquisition command is an acquisition:
   either of a flight parameter relating to a variation in the collective pitch of the blades of a main rotor of the rotorcraft, which parameter may be a constant value or a value variation to be maintained, the value of a flight parameter relating to a variation in the cyclic pitch of the main rotor and the value of a flight parameter relating to a variation in the collective pitch of an anti-torque rotor of the rotorcraft remaining unchanged;
   or a flight parameter relating to a variation in the cyclic pitch of the blades of the main rotor, being either a constant value or a value variation to be maintained, the value of a flight parameter relating to a variation in the collective pitch of the blades of the main rotor and the value of a flight parameter relating to a variation in the collective pitch of the anti-torque rotor remaining unchanged;
   or both of said flight parameters relating to respectively to a collective pitch variation and to a cyclic pitch variation of the blades of the main rotor, which may be constant values or value variations to be maintained, the value of a flight parameter relating to a variation in the collective pitch of the blades of the anti-torque rotor remaining unchanged;
   or else a flight parameter relating to a variation of the collective pitch of the blades of the anti-torque rotor, which may be a constant value or a value variation to be maintained, the value of a flight parameter relating to a variation in the cyclic pitch of the main rotor and the value of a flight parameter relating to a variation in the collective pitch of the main rotor remaining unchanged.

6. The method of claim 1, wherein the value of said at least one flight parameter is evaluated depending on the actual state of progression of the rotorcraft as determined by onboard instrumentation of the rotorcraft; the onboard instrumentation comprises a plurality of measurement means, including:
- means for determining a rate of progression of the rotorcraft along at least any one of the progression axes (P, R, V, Y) of the rotorcraft, which rate of progression may equally well be vertical speed, air speed, indicated air speed, and/or ground speed;
- means for determining a slope of the rotorcraft;
- barometric means for measuring the altitude of the rotorcraft;
- radio altimeter means for measuring the height of the rotorcraft;
- means for evaluating a deviation of the rotorcraft from a horizontal path (P, R) relative to a path setpoint previously acquired by the autopilot;
- means for evaluating a deviation of the rotorcraft from a vertical path (V);
- means for determining the progression of the rotorcraft by radio navigation; and
- inertial sensor means, comprising accelerometers and/or angular speed sensors of the rotorcraft.

7. The method of claim 1, wherein generating the acquisition command comprises:
- acquiring a current value of the flight parameter relating to each path setpoint to be acquired and applicable to the at least one progression axis from which the behavior of the rotorcraft is being modified by the person;
- replacing the value of said flight parameter used by the autopilot prior to the manual control member being driven with said current value;
- using as a value of the setpoint path-maintaining a value of said flight parameter evaluated depending on the actual state of progression of the rotorcraft and determined by onboard instrumentation of the rotorcraft.

8. The method of claim 1, further comprising performing a display operation by a head-up display, by a head-down display, or by an in-between display.

9. The method of claim 8, wherein the display of the environment outside the rotorcraft is a representation of the world outside the rotorcraft as a three-dimensional image.

10. The method of claim 1, wherein operation of the path-maintaining function is dependent on a calculation operation to determine the pertinence of the at least one manual control member being moved, the calculation being based on processing the detection signal.

11. A method according to claim 10, wherein the inhibit command suspends the guide mode for which the acquisition request was issued.

12. An automatic flight control system for a rotorcraft, the rotorcraft having manual control members to be driven by a person to cause a modification to the behavior of the rotorcraft relative to at least one progression axe (P, R, V, Y) including pitching (P), roll (R), verticality (V), and yaw (Y), the automatic flight control system comprising:
- a memory for storing flight setpoints relative to each of the progression axes;
- onboard instrumentation for evaluating an actual state of progression of the rotorcraft; and
- an autopilot that generates commands in predefined operating modes, the commands causing a modification to the behavior of the rotorcraft relative to at least one progression axis (P, R, V, Y);
- wherein the autopilot incorporates a multiple choice control member to select at least one path-maintaining function including at least one guide mode (G) for guiding the rotorcraft relative to at least one of the progression axes (P, R, V, Y);
- wherein the autopilot includes for the path-maintaining function a detector for acquiring at least one path setpoint defined by at least one flight parameter and to detect driving movements of a manual control member for acquiring the path setpoint when the manual control member is being driven by a person, the path setpoint relating to the guide mode (G) so that as a result of the person driving the manual control member to cause a modification to the behavior of the rotorcraft relative to one of the progression axes (P, R, V, Y), the autopilot generates:
  - an inhibit command whereby the autopilot inhibits the guide mode (G) of the rotorcraft for which the acquisition has been issued and relating to the progression axis relative to which the behavior of the rotorcraft is being modified by the person; and
  - an acquisition command whereby the autopilot acquires a value of the flight parameter relating to the path setpoint to be acquired and applicable to the progression axis from which the behavior of the rotorcraft is being modified by the person, the value of the flight parameter being acquired from the onboard instrumentation evaluating the actual state of progression of the rotorcraft, and upon the driving of the manual control member being interrupted, an other value of the flight parameter takes the place of the value of the flight parameter that was acquired, the other value being derived from the flight setpoints stored in the memory prior to the inhibit command;
- wherein the autopilot maintains the values of the path setpoints relating to the other guide modes (G) that have continued to be engaged and that relate to other progression axes (P, R, V, Y) prior to said person moving said manual control member, the commands generated by the autopilot relating to all of the progression axes that continue to be engaged being adapted by the autopilot depending on the current state of progression of the rotorcraft on the basis of said maintained path setpoints and on the basis of the value of the flight parameter for which said acquisition request was issued.

13. The system of claim 12, wherein the onboard instrumentation comprises a plurality of measurement means, including:
- rate of progression determining means for determining a rate of progression of the rotorcraft along at least any one of the progression axes (P, R, V, Y) of the rotorcraft, which rate of progression may be vertical speed, air speed, indicated air speed, and/or ground speed;
- slope determining means for determining a slope of the rotorcraft;
- barometric means for measuring the altitude of the rotorcraft;
- radio altimeter means for measuring the height of the rotorcraft;
- horizontal deviation evaluating means for evaluating a deviation of the rotorcraft from a horizontal path (P, R) relative to a path setpoint previously acquired by the autopilot;
- vertical deviation evaluating means for evaluating a deviation of the rotorcraft from a vertical path (V);
- radio navigation progression means for determining the progression of the rotorcraft by radio navigation; and
- inertial sensor means, comprising at least one of: accelerometers, angular speed sensors.

14. The system of claim 12, wherein the system further includes a display member for associating a performance of the path-maintaining function with an operation of displaying on the display member together with a representation of the environment outside the rotorcraft, the representation having a model representing the rotorcraft, a representation of a landing zone for the rotorcraft moving relative to said landing zone, and the following illustrations relating to said outside environment:

- an illustration of a variation in the orientation of the rotorcraft relative to a horizon line;
- an illustration of a variation in the orientation and the position of the rotorcraft relative to the displayed landing zone; and
- at least one illustration of information predicting the position and the orientation of the rotorcraft relative to the displayed landing zone, said predictive information being derived by projection from variation in the position and the orientation of the rotorcraft from at least one current path setpoint.

15. A rotorcraft having an automatic flight control system according to claim 12.

16. The rotorcraft of claim 15, wherein the rotorcraft further includes at least one display for a display operation of the rotorcraft during the predefined operating modes; the display being at least one of: a head-up display, a head-down display, an in-between display.

17. The rotorcraft of claim 16, wherein the display of the environment outside the rotorcraft is a representation of the world outside the rotorcraft as a three-dimensional image.

* * * * *